March 8, 1932. O. P. WYATT 1,848,685
VEHICLE DIRECTION SIGNAL
Filed July 23, 1929
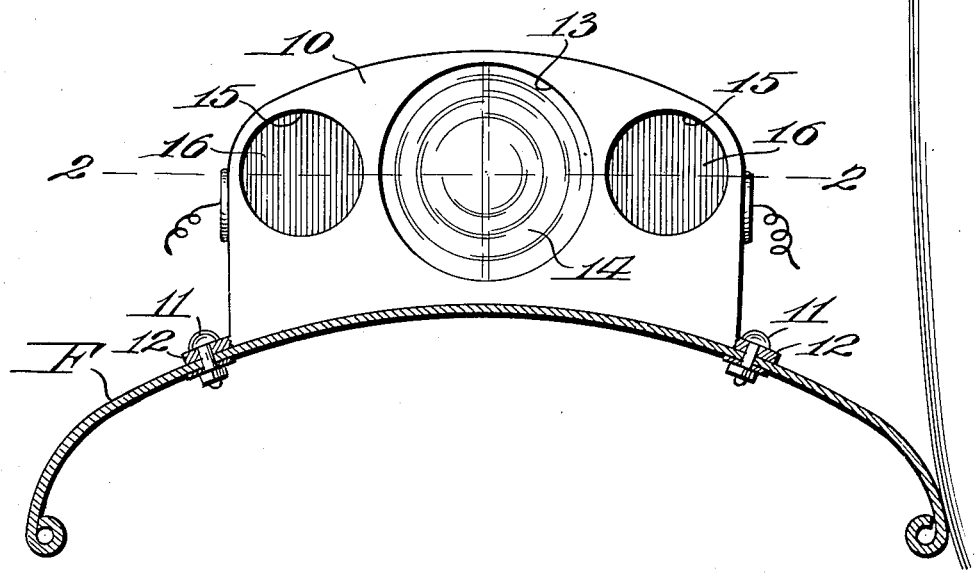
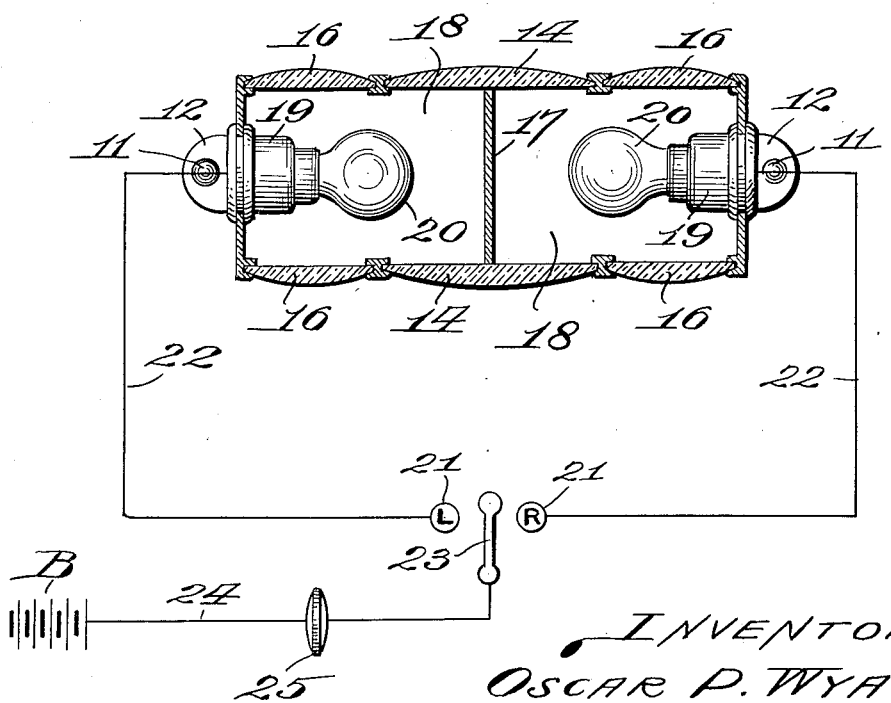
INVENTOR:—
OSCAR P. WYATT.
By Martin P. Smith ATTY.

Patented Mar. 8, 1932

1,848,685

UNITED STATES PATENT OFFICE

OSCAR P. WYATT, OF LOS ANGELES, CALIFORNIA

VEHICLE DIRECTION SIGNAL

Application filed July 23, 1929. Serial No. 380,385.

My invention relates to a direction indicating signal for motor vehicles and the principal objects of my invention are, to generally improve upon and simplify the construction of the existing forms of motor vehicle direction signals, to provide a signaling device that is mounted where it may be readily observed from in front and to the rear of the equipped vehicle; further, to provide a signal that is always under ready control of the driver of the vehicle, and further, to provide a signaling device of the character referred to that is relatively simple in construction, inexpensive of manufacture and very effective in performing the functions for which it is intended.

Further objects of my invention are, to provide a vehicle direction signal that is especially designed for use while the equipped vehicle is being driven at night, said signaling device being provided with means for illuminating windows in the front and rear walls of the housing so as to indicate the direction in which the driver of the vehicle is about to turn, and further, to provide electric connections to the signal illuminating means, with an automatic device known as a flasher, that is effective in intermittently opening and closing the electric circuit to the signal, so that the latter flashes intermittently, thereby attracting the attention of the drivers of approaching vehicles to a greater extent than if the signal were illuminated continuously.

With the foregoing and other objects in view, my invention consists in certain novel features of construction and arrangement of parts that will hereinafter be more fully described and claimed and illustrated in the accompanying drawings, in which:

Fig. 1 is an elevational view of my improved direction signal and showing the same mounted on the upper portion of the left rear fender of an automobile.

Fig. 2 is a horizontal section taken on the line 2—2 and showing the electrical connections that are utilized for illuminating the interior of the housing.

Referring by numerals to the accompanying drawings, which illustrate a practical embodiment of my invention, 10 designates a housing, preferably constructed of sheet metal and the underside of said housing is shaped so as to fit on top of the rear left fender F of an automobile. The housing may be secured to the fender in any suitable manner, preferably by means of screws or bolts 11 that pass through ears 12 that project from the lower portions of the ends of the housing and which bolts also pass through the fender F.

The front and rear walls of the housing 10 are parallel and formed in the central portions of said walls are openings 13, over which are arranged lenses 14 or sections of transparent or translucent material such as glass, which latter may be clear, white or green in color.

Formed in the end portions of the front and rear walls of the housing and preferably in horizontal alignment with openings 13 are openings 15 that are smaller than the openings 13 and overlying these smaller openings are lenses 16 or sections of transparent or translucent material such as glass and these lenses or sections of transparent material are preferably colored red.

Centrally arranged within the housing 10 is a vertically disposed partition 17 that extends diametrically across the centers of the openings 13 and thus the space within the housing is divided into two chambers 18 that are substantially equal in size and which function as lamp chambers.

Secured to the end walls of the housing 15 are sockets 19 for small electric lamps 20 which, when fitted in said sockets, occupy positions in the centers of the chambers 18. These lamps are preferably of the single contact type and leading from the sockets 19 to contacts 21 that are located at a point convenient to the driver of the vehicle are conductors 22. The contact member 21 that is connected to the lamp in the left hand lamp housing 18 is marked with the letter "L" or the word "Left" and the other contact 21, which is connected to the lamp in the right hand one of the lamp chambers 18 is marked with the letter "R" or the word "Right."

Arranged between the contacts 21 is a manually operable switch lever 23 that is connected to a suitable source of electric energy, preferably the battery B that forms a part of the lighting and ignition system of the automobile and located in the connection 24, between said switch and the battery, is an automatic current flow interrupter 25 and which is known as a flasher. This interrupter or flasher forms no part of my invention inasmuch as there are different forms of flashers that are readily obtainable in the open market and which are specially applicable for use in connection with my improved direction signal.

Under normal conditions or while driving straight forward, switch 23 occupies a position between the contacts 21 and when the driver of the vehicle is about to make a left or right hand turn switch lever 23 is shifted to the right or left as the case may be, thereby engaging one of the contacts 21 and consequently causing the corresponding one of the lamps 20 to burn by reason of current flow received from the battery B through the connections 22, 21, 23, 25 and 24. Thus the interior of the corresponding lamp chamber 18 is illuminated and rays of light will pass through the corresponding openings 15 that are closed by colored lenses 16 or sections of colored glass and likewise through half of the openings 13 and the lenses or transparent sections of glass that cover the same.

This display of a red light on the right or left of a white or green colored light gives a turning signal which may be readily noted by the drivers of vehicles in front and to the rear of the equipped vehicle and immediately after the circuit has been closed between the battery and the lamp, the flasher 25 will automatically operate to effect an intermittent interruption of the current flow, thus causing the corresponding lamp to be intermittently lighted.

Obviously the intermittent lighting of the signal lamp will attract the attention of the drivers of approaching vehicles to a much greater extent than if the signal lamp burns continously.

By mounting the signal on top of the left rear fender said signal is readily visible to the drivers of vehicles in front and to the rear of the equipped vehicle and when the signal is in operation the drivers of approaching vehicles will, by observation, be aware of the intended movements of the equipped vehicle.

While I have shown and described my improved signal as being mounted on the rear left hand fender of an automobile, said signal may be mounted on any portion of the vehicle, for instance, on one of the rear springs or upon a bracket or some part of the rear portion of the vehicle body.

In all instances, however, the signals should be mounted so as to be readily visible from points in front and to the rear of the vehicle on which the signal is mounted.

Thus it will be seen that I have provided a motor vehicle direction signal that is relatively simple in construction, inexpensive of manufacture and which, in operation, produces a flashing two-color illuminated signal.

It will be understood that minor changes in the size, form and construction of the various parts of my improved motor vehicle direction signal may be made and substituted for those herein shown and described without departing from the spirit of my invention, the scope of which is set forth in the appended claims.

I claim as my invention:

1. A signal comprising a casing having a wall provided with a central opening and a pair of other openings spaced on opposite sides of the central opening, lenses held in said openings, a partition extending vertically in the casing and diametrical to the central opening whereby each end of the wall includes half of the central opening and one of the remaining openings, and lamps each mounted in the casing at a respective side of the partition.

2. A signal comprising a casing having a wall provided with a central opening and a pair of other openings spaced on opposite sides of the central opening, lenses held in said openings, a partition extending vertically in the casing and diametrical to the central opening whereby each end of the wall includes half of the central opening and one of the remaining openings, and lamps each mounted in the casing at a respective side of the partition, said central opening being of greater diameter than the end openings and all of said openings being of circular form.

In testimony whereof I affix my signature.

OSCAR P. WYATT.